United States Patent
Stanich et al.

(10) Patent No.: US 7,333,244 B2
(45) Date of Patent: Feb. 19, 2008

(54) METHOD AND SYSTEM FOR EMBEDDING AN IMAGE INTO TWO OTHER IMAGES

(75) Inventors: Mikel J. Stanich, Longmont, CO (US); Gerhard R. Thompson, Wappingers Falls, NY (US); Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 10/758,536

(22) Filed: Jan. 16, 2004

(65) Prior Publication Data

US 2005/0157906 A1  Jul. 21, 2005

(51) Int. Cl.
*G06K 15/00*  (2006.01)
(52) U.S. Cl. ............... 358/3.28; 358/3.03; 358/3.04; 358/3.05; 358/3.06; 358/534; 382/100
(58) Field of Classification Search ............... 358/3.28, 358/3.03, 3.04, 3.05, 3.06, 534; 382/100
See application file for complete search history.

(56) References Cited

U.S. PATENT DOCUMENTS

| | | | | |
|---|---|---|---|---|
| 5,561,751 A | * | 10/1996 | Wong | 345/589 |
| 5,734,752 A | * | 3/1998 | Knox | 358/3.28 |
| 5,734,753 A | * | 3/1998 | Bunce | 382/237 |
| 5,790,703 A | * | 8/1998 | Wang | 358/3.28 |
| 5,982,992 A | * | 11/1999 | Waldron | 358/1.9 |
| 6,304,333 B1 | * | 10/2001 | Shaked et al. | 358/1.1 |
| 6,426,802 B1 | * | 7/2002 | Lin | 358/1.9 |
| 6,483,606 B1 | * | 11/2002 | Klassen et al. | 358/1.9 |
| 6,603,573 B1 | * | 8/2003 | Adler et al. | 358/1.9 |
| 7,006,254 B2 | * | 2/2006 | Wu | 358/3.03 |
| 7,027,191 B1 | * | 4/2006 | Steinhauer | 358/3.2 |
| 2002/0171853 A1 | * | 11/2002 | Wu | 358/1.9 |
| 2003/0117653 A1 | * | 6/2003 | Velde et al. | 358/3.01 |

OTHER PUBLICATIONS

Wu, C.—"Digital Watermarking and Steganography via Overlays of Halftone Images"—SPIE- Oct. 2004, vol. 5561, pp. 152-163.*
Chai Wah Wu, "Multimedia Data Hiding and Authentication via Halftoning and Coordinate Projection", EURASIP Journal of Applied Signal Processing, 2002, pp. 143-151.
Chai Wah Wu, et al., "A Unified Framework for Digital Halftoning and Dither Mask Construction: Variations on a Theme and Implementation Issues", Proc. IS &T's NIP19: INT'L Cont. on Digital Printing Tech., pp. 793-796, 2003.

(Continued)

*Primary Examiner*—Jingge Wu
*Assistant Examiner*—Bernard Krasnic
(74) *Attorney, Agent, or Firm*—Stephen C. Kaufman, Esq.; McGinn IP Law Group, PLLC

(57) ABSTRACT

A method of embedding an image into two images by performing a digital halftoning process on a Cartesian product of color spaces to embed the image into the two images. A digital halftoning process includes an iterative isotropic halftoning process. The iterative isotropic halftoning process for each iteration if Outimage has not changed between two iterations or maximum number of iterations reached, then exit the iterations loop.

12 Claims, 8 Drawing Sheets

OTHER PUBLICATIONS

Chai Wah Wu, et al., "Multiple Images Viewable on Twisted-Nematic Mode Liquid-Crystal Displays", IEEE Signal Processing Letters, vol. 10, No. 8, Aug. 8, 2003, pp. 225-227.

Ming Sun Fu, et al., "A Novel Self-Conjugate Halftone Image Watermarking Technique", IEEE, 2003, pp. 790-793.

Ming Sun Fu, et al. "A Novel Method to Embed Watermark in Different Halftone Images: Data Hiding by Conjugate Error Difusion (DHCED)", IEEE, ICASSP 2003, pp. 529-532.

Ming Sun Fu, et al., "Data Hiding in Halftone Images by Stochastic Error Diffusion", IEEE, 2001, pp. 1965-1968.

J. Sullivan, et al. "Design of Minimum Visual Modulation Halftone Patterns", IEEE Transactions on Systems, Man, and Cybernetics, vol. 21, No. 1, Jan./Feb. 1991, pp. 33-38.

Roy Adler, et al., "Error Bounds for Error Diffusion and Related Digital Halftoning Algorithms", IEEE, 2001, pp. 513-516.

Kenneth R. Crounse, et al. "Image Halftoning with Cellular Neural Networks", IEEE Transactions on Circuits and Systems-II: Analog and Digital Signal Processing, vol. 40, No. 4, Apr. 1993, pp. 267-283.

C. Bradford Barber, et al. ,"The Quickhull Algorithm for Convex Hulls", ACM Transactions on Mathematical Software, vol. 22, No. 4, Dec. 1996, pp. 469-483.

Robert Ulichney, "Digital Halftoning", The MIT Press, 1987, fourth printing 1993, pp. 239-243.

Roy Adler, et al., "Error Bounds for Error Diffusion and Other Mathematical Problems Arising in Digital Halftoning", IS&T/SPIE Conference on Color Imaging: Device-Independent Color, Color Hardcopy, and Graphic Arts V, San Jose, California, Jan. 2000, pp. 437-443.

Hideaki Haneishi, et al., "Color Digital Halftoning Taking Colorimetric Color Reproduction Into Account", Journal of Electronic Imaging, Jan. 1996, vol. 5, pp. 97-106.

Risto Nasanen, "Visability of Halftone Dot Textures", IEEE Transactions on Systems, Man, and Cybernetics, vol. SMC-14, No. 6, Nov./Dec. 1984, pp. 920-924.

* cited by examiner

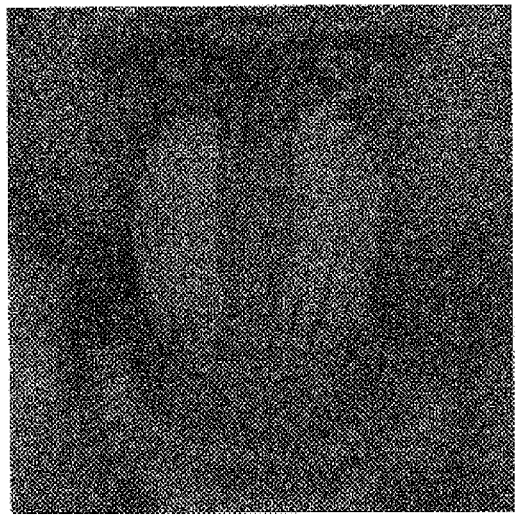
FIG.5A
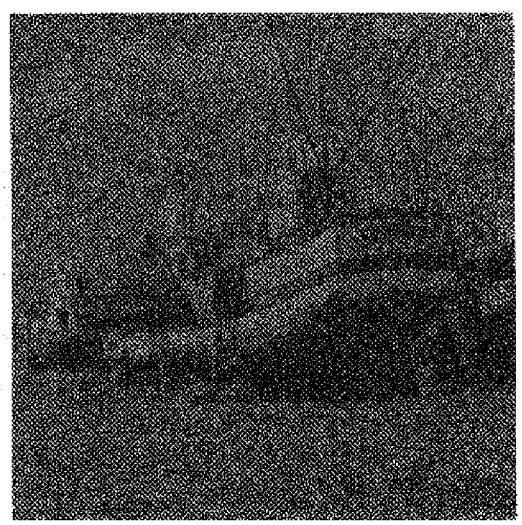
5B
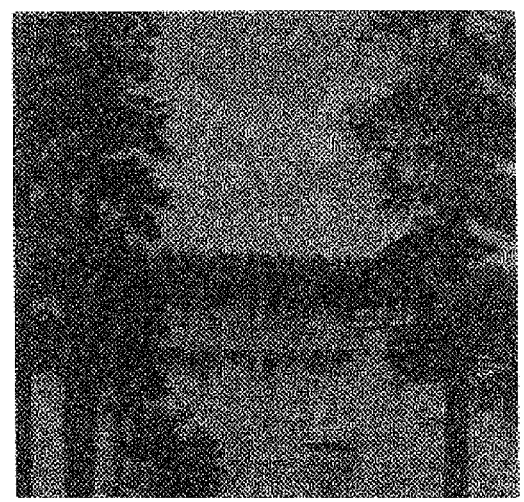
FIG.5C

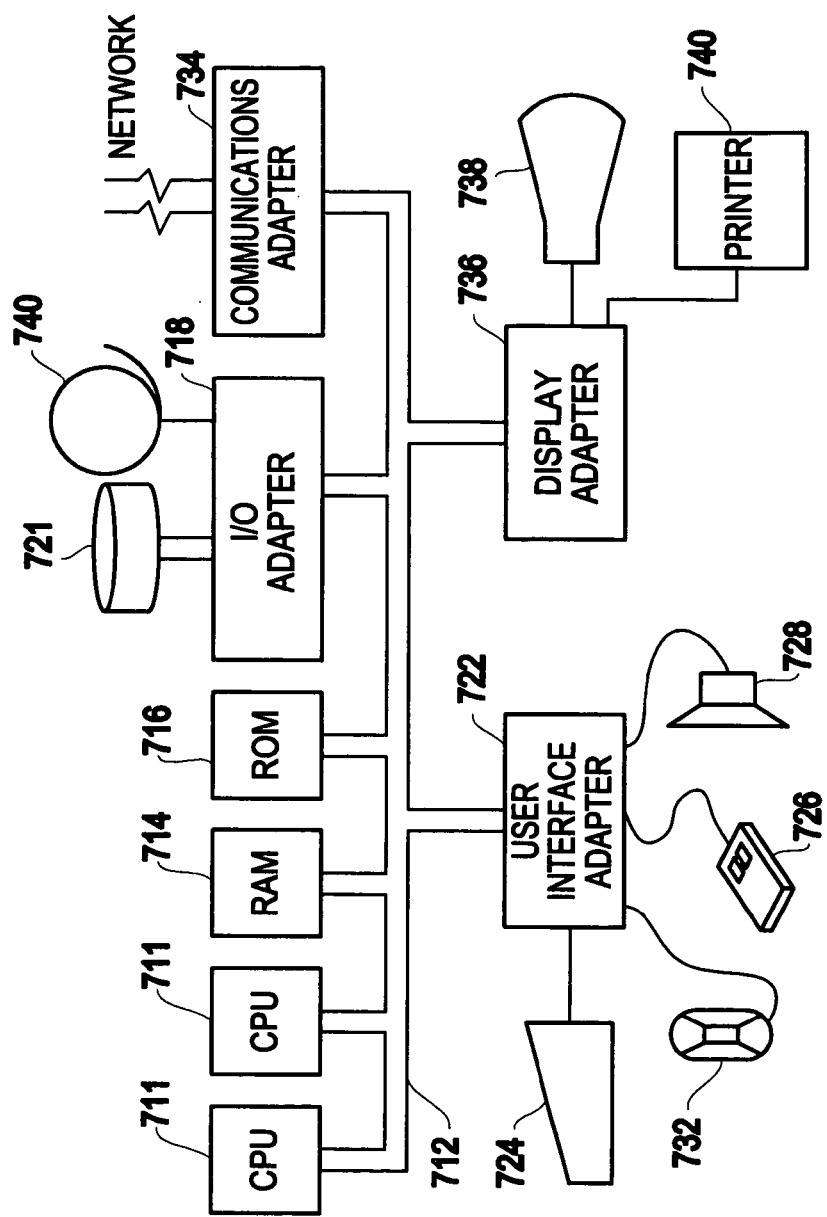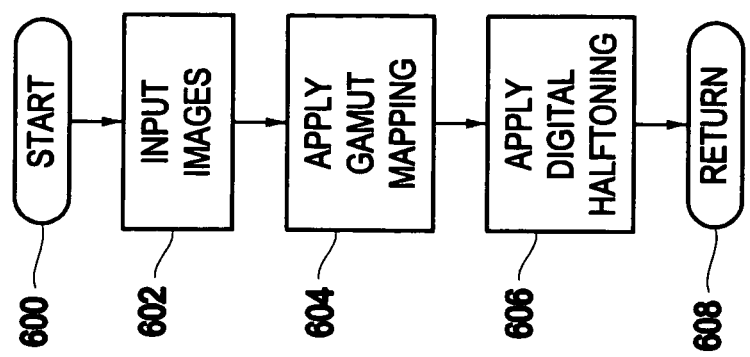

METHOD AND SYSTEM FOR EMBEDDING AN IMAGE INTO TWO OTHER IMAGES

BACKGROUND OF THE INVENTION

1. Field of the Invention

The present invention generally relates to a method and system to embed an image. More particularly, the present invention relates to a method and system to embed one or more images into two or more other images.

2. Description of the Related Art

Recently, several watermarking schemes have been proposed where a watermark is embedded in two halftone images such that the watermark can be extracted by simply overlaying these halftone images.

In one conventional method, the two halftone images are created using dither masks, while another conventional method creates the two halftone images using an error diffusion technique. The watermark images in these schemes are binary images and any correlation between the binary pixels of the two halftone images depends upon whether corresponding pixels in the watermark are black or white.

There are several limitations to these conventional methods of extracting watermarks. First, the watermark images must be binary and cannot be grayscale or color.

Second, because the watermark is embedded in the two images based upon a correlation, the average intensity of a region of pixels is needed to identify whether the watermark pixel is black or white. Therefore, the watermark images that may be extracted using these conventional methods may only be simple graphics. In other words, the watermarks are limited to simple images such as logos or simple graphics and cannot contain detailed features.

Third, the watermark images that are extracted using these conventional methods contain residual patterns and features from the two halftone images in which the watermark was embedded. These residual patterns and features reduce the fidelity of the watermark image that is extracted. Therefore, this is another reason why a watermark image cannot have fine details and be successfully processed using a conventional watermarking method.

Fourth, the embedding by these conventional methods is only capable of generating binary halftone images, rather than grayscale or multi-bit images. These binary halftone images also limit the fidelity of the extracted watermark.

Consider an image as a matrix of pixels, i.e. an image G includes pixels $G(i,j)$ where $G(i,j)$, the $(i,j)$-th pixel of image G, is a vector in a color space. For grayscale pixels, the color space may be one-dimensional whereas for RGB pixels, the color space may be 3-dimensional. A set of n images $G_1, G_2, \ldots, G_n$ of the same size can be considered as a matrix of n-tuples of pixels. This is denoted as $G_1 \times G_2 \times \ldots \times G_n$, i.e. the $(i,j)$-th element of $G_1 \times G_2 \times \ldots \times G_n$ is the n-tuple $(G_1(i,j), \ldots, G_n(i,j))$. Equivalently, a set of n images can be considered as a single image whose color space is the Cartesian product of the n color spaces of the images $G_1, G_2, \ldots, G_n$.

Consider an image transform "$\Phi$" which acts on an n-tuple of pixels and produces an m-tuple of pixels, i.e. $\Phi(p_1, \ldots, p_n) = (q_1, \ldots, q_m)$ where $p_i$ and $q_i$ are pixels. By applying the transform $\Phi$ to each of the n-tuples of pixels in $G_1 \times G_2 \times \ldots \times G_n$, this transform acts on a set of n images and produces m images. The m auxiliary images may be watermark images that are extracted by the watermark extraction transform $\Phi$.

Another aspect to consider is how images are perceived under different viewing conditions. In other words, the n images plus the m extracted images can be considered as how a single image is perceived under different viewing conditions. Such an interpretation for the case n=1 can be found in C. W. Wu et al, "Multiple images viewable on twisted-nematic mode liquid-crystal displays," IEEE Signal Processing Letters, vol. 10, no. 8, pp. 225-227, 2003.

If a goal is to produce a set of n images, such that these images plus the additional m images that are generated by the transform $\Phi$ matches another set of n+m predefined images, perfect matching is not possible because there are more sets of n+m images than there are sets of n images.

Instead of perfect matching, conventional watermarking methods utilizing halftoning take advantage of the fact that the images only need to look similar when viewed at an appropriate distance. Because of the "low pass behavior" of the human vision system, only low-pass versions of the images need to match. In this manner, the human visual system reduces the amount of information in images, which allows the use of a digital half-toning algorithm to provide a solution to the problem.

Yet another conventional watermarking scheme constructs two binary halftone images A and B, which when overlaid on top of each other reveals a watermark image C. Assuming that each pixel of image A and image B are either 0 (denoting a white pixel) or 1 (denoting a black pixel), the overlay operation can be expressed as $C(i,j) = A(i,j) \Theta B(i,j)$ where function "$\Theta$" is the OR operation.

These conventional methods embed the watermark image based on a correlation of the pixels between the two images and the ability to extract a watermark is based upon whether corresponding pixels in each of the two images vary together. For example, for a watermark image W that is a binary image, when $W(i,j)=0$, the corresponding pixels in A and B are correlated and when $W(i,j) \neq 0$ the corresponding pixels in A and B are not correlated. This implies that when $W(i,j)=1$ the overlaid pixels $C(i,j)$ will be darker on average than when $W(i,j)=0$ and, thus, C will reveal the watermark image W. However, as explained above, the pixels that are not correlated are darker than the correlated pixels only when averaged over a region of pixels. Therefore, the watermark cannot contain fine details. Furthermore, the pixels in the watermark image still reveal residual features of images A and B when overlaid.

SUMMARY OF THE INVENTION

In view of the foregoing and other exemplary problems, drawbacks, and disadvantages of the conventional methods and structures, an exemplary feature of the present invention is to provide a method and structure in which an image is embedded into two other images.

In a first exemplary aspect of the present invention, a method of embedding an image into two images includes performing a digital halftoning process on the Cartesian product of color spaces to embed the image into the two images.

In a second exemplary aspect of the present invention, a method of extracting an image from two images includes extracting the image from the two images using a binary operation on each pair of pixels from the two images.

In a third exemplary aspect of the present invention, a method of embedding a color image into two color images includes decomposing the color images into separate images in their color planes, and for each color plane, performing a digital halftoning process on the Cartesian product of pixel value spaces to embed the image into the two images, and combining the halftone images of the color planes into a single color image.

In a fourth exemplary aspect of the present invention, a method of embedding a multi-bit image into two multi-bit images includes performing a digital halftoning process on the Cartesian product of color spaces to embed the multi-bit image into the two multi-bit images.

In a fifth exemplary aspect of the present invention, a signal-bearing medium tangibly embodying a program of machine-readable instructions executable by a digital processor. The program includes instructions for performing a digital halftoning process on the Cartesian product of color spaces to embed the image into the two images.

In a sixth exemplary aspect of the present invention, a system for embedding an image into two images includes means for providing an image to be embedded into two images and means for performing a digital halftoning process on the Cartesian product of color spaces to embed the image into the two images.

In a seventh exemplary aspect of the present invention a system for embedding an image into two images includes an image input device, and a digital halftoning device that performs a digital halftoning process on a Cartesian product of color spaces to embed the image received by the image input device into the two images.

An exemplary embodiment of the present invention embeds a grayscale image into two images that have a substantially similar level of detail as the image being embedded.

Additionally, an exemplary embodiment of the invention ensures that there is no residual image on the extracted watermark, thereby enabling extraction of a very high fidelity watermark.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIGS. 5A-5E illustrate the results of a further exemplary embedding method of two images into three other images in accordance with the present invention;

FIG. 6 illustrates a flowchart of an exemplary control routine in accordance with the present invention;

FIG. 7 illustrates an exemplary image embedding system 700 for incorporating the present invention therein;

DETAILED DESCRIPTION OF PREFERRED EMBODIMENTS OF THE INVENTION

Figure 1A:
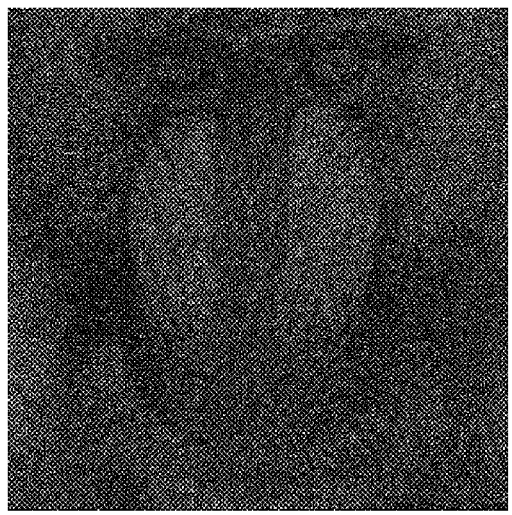
FIGS. 1A-1C illustrate the results of an exemplary embedding method of one image into two other images in accordance with the present invention.

Referring now to the drawings, and more particularly to FIGS. 1-9, there are shown exemplary embodiments of the method and structures of the present invention.

In contrast to conventional methods as referenced in the above referenced C. W. Wu et al paper, an exemplary embodiment of the present invention embeds and/or extracts an image (e.g., a watermark) using at least two other images.

An exemplary embodiment of the present invention also differs from the conventional art of using conventional halftoning to embed a watermark into two images, as referenced in U.S. Pat. Nos. 5,734,753 and 5,790,703 and in M. Fu et al, "Data hiding in halftone image by stochastic error diffusion," Proc. IEEE Int. Conf. ASSP, pp. 1965-1968, 2001, M. Fu et a al, "A novel method to embed watermark in different halftone images: data hiding by conjugate error diffusion (dhced)," Proc. IEEE Int. Conf. ASSP, pp. III-529-532, 2003 and M. Fu et al., "A novel self-conjugate halftone image watermarking technique," Proc. IEEE Int. Symp. Circ. Syst., pp. III-790-793, 2003, as an exemplary embodiment of the present invention utilizes a halftoning algorithm on the Cartesian product of pixel spaces, i.e., halftoning is done on n-tuples of pixels. In this manner, an exemplary embodiment of the present invention overcomes the shortcomings of the conventional methods described above.

A description of one exemplary embodiment of the present invention follows. Given grayscale images $A_1'$, $A_2'$, and $A_3'$, two halftone images $A_1$ and $A_2$ may be constructed. The image $A_3'$ represents a watermark which is to be embedded into the two images $A_1'$, $A_2'$.

From the two images $A_1$ and $A_2$, a watermark image $A_3$ can be extracted by the operation $A_3(i,j)=A_1(i,j) \circ A_2(i,j)$. The binary operator $\circ$ is OR in the case of overlaying images, but with the present invention can be any (not necessarily symmetric) binary operator such as Exclusive-OR, AND, etc., without limitation. A binary operation or operator means that the operation has two input arguments. Therefore, an exemplary embodiment of the present invention is not limited to any specific type of binary operation.

An aspect of an exemplary embodiment of the present invention is to construct $A_1$ and $A_2$ such that they resemble $A_1'$ and $A_2'$ respectively, and such that $A_3$ resembles $A_3'$.

An exemplary embodiment of the present invention constructs images $A_1$ and $A_2$ via digital half-toning on a Cartesian product of color spaces.

The input to an exemplary digital half-toning method in accordance with the present invention are pixels of an image $U=A_1' \times A_2' \times A_3'$ that is a composite of the three images $A_1'$, $A_2'$ and $A_3'$. The pixels of U are given by $U(i,j)=(A_1'(i,j), A_2'(i,j), A_3'(i,j))$. In this exemplary embodiment the output halftone images $A_1$ and $A_2$ are binary, and, thus, the possible values for each pixel pair $(A_1(i,j), A_2(i,j))$ are (0, 0), (1, 0), (0, 1), and (1, 1).

Thus, since $A_3(i,j)=A_1(i,j) \circ A_2(i,j)$, a possible vector in the space of triples of pixels for $A_1 \times A_2 \times A_3$ is one the following: (0, 0, 0 $\circ$ 0), (0, 1, 0 $\circ$ 1), (1, 0, 1 $\circ$ 0), and (1, 1, 1 $\circ$ 1) which will be called "output vectors."

An exemplary digital half-toning algorithm may operate in a space of triples of pixels to halftone the images $(A_1' \times A_2' \times A_3')$ using these 4 output vectors, and the resulting output halftone image $(A_1 \times A_2 \times A_3)$ is such that $A_1 \approx A_1'$, $A_2 \approx A_2'$ and $A_3 \approx A_3'$, where $A_1 \approx A_1'$ indicates that $A_1$ looks like $A_1'$ when viewed at a distance. The desired output images are $A_1$ and $A_2$ which, by construction, combine via an exemplary embodiment of the inventive watermark extraction operation to produce $A_3$.

There are several choices for a digital halftoning method that may be used in conjunction with an exemplary embodiment of the present invention. The selection of the digital halftoning method may be determined by the desired tradeoff between processing speed and the quality of the halftone generated.

For example, a vector error diffusion method (VED), as described in H. Haneishi et al, "Color digital halftoning taking calorimetric color reproduction into account", Journal of Electronic Imaging, vol. 5, pp. 97-106, 1996, is a one-pass method that is fast and produces good halftones. Another example is a modified error diffusion method described in R. Adler et al, "Error bounds for error diffusion and other mathematical problems arising in digital halftoning," Proc. of SPIE, vol. 3963, pp. 437-443, 2000 and in R. Adler et al, "Error bounds for error diffusion and related digital halftoning algorithms," Proc. IEEE Int. Symp. Circ. Syst., vol. II, pp. 513-516, 2001, which alleviates some of the problems that may be due to large errors in the vector error diffusion method.

These one-pass methods analyze and process each n-tuple of pixels once in a specific order. This ordering of pixels to be processed, and the causality of the error diffusion filter (such as the Jarvis filter or the Stucki filter) may cause anisotropic artifacts in the halftone image. For more information on error diffusion, see the books "Digital Halftoning" by R. Ulichney, MIT Press, 1987 and "Digital Color Halftoning" by H. Kang, SPIE Press monograph vol. PM68, 1999.

Further, in some digital watermarking or data hiding applications there could be constraints on the relationships between pixels in an image that are far apart and, for these applications, error diffusion may not be appropriate. An example of such a watermarking application is described below.

Therefore, an exemplary embodiment of the present invention uses an iterative isotropic halftoning method in order to embed the images. This halftoning method is described in C. W. Wu, "Multimedia Data Hiding and Authentication via Halftoning and Coordinate Projection", EURASIP Journal on Applied Signal Processing, vol. 2002, no. 2, pp. 143-151, 2002, where it was used to embed a single image inside another image. In contrast, the present invention embeds one or more images into two or more images.

An exemplary pseudo code for this halftoning method follows:

```
for each iteration      /* Loop through iterations */
    for each i          /* Loop through each row */
        for each j      /* Loop through each column */
            for each output vector o = (o₁, o₂, o₃) ∈ P
            /* Loop through all possible output vectors */
                replace Outimage_k(i, j) with o_k for k = 1, 2, 3.

set Error(o) = ∑_{k=1}^{3} v_k ||L(Outimage_k - A'_k)|| endfor
            find output vector o_min ∈ P that minimizes Error, i.e.

o_min = arg min_{o∈P} Error(o).
``` set Outimage(i, j) = o_min.
        endfor (j)
    endfor (i)
    if Outimage has not changed between two iterations or
    maximum number of iterations reached, exit iterations loop.
endfor Where:
$A_1'$, $A_2'$ and $A_3'$ are input images;
P is a set of output vectors;
Output: set $(A_1, A_2, A_3)$=Outimage which resembles $(A_1', A_2', A_3')$.

The two halftone images are $A_1$ and $A_2$.
$V_k$ determines how strongly the error in each image is minimized; and
L is a linear space-invariant model of the human vision system.

$Outimage_k$ denotes the k-th component of Outimage, i.e. if Outimage=$(A_1, A_2, A_3)$, then $Outimage_k$=$A_k$. The input are three images ($A_1'$, $A_2'$, $A_3'$) and the output are 2 halftone images $A_1$ and $A_2$. The constant $v_k$ determines how strongly the error in each corresponding image is minimized.

In an exemplary embodiment of the present invention, for each iteration, the algorithm loops through each pixel of $A_1' \times A_2' \times A_3'$ and selects the output vector from P that when put in the corresponding position in Outimage minimizes the error measure "Error". The pixel in Outimage at that position is then set as this output vector.

The error measure "Error" may be calculated as follows: for each of the images, the norm of the low pass filtered version of the difference between $A_k'$ and $Outimage_k$ is calculated and the weighted sum of these norms form the error measure. Thus, minimizing this error measure allows the low pass filtered version of the components of Outimage to resemble each $A_k'$. The low pass filter (expressed as the linear operator L) may be taken from a HVS filter. Some examples of such filters can be found in R. Näsänen, "Visibility of halftone dot textures", IEEE Trans. Syst. Man, Cybernetics, vol. 14, no. 6, pp. 920-924, 1984 and in J. Sullivan et al, "Design of minimum visual modulation halftone patterns," IEEE Trans. Syst. Man, Cybernetics, vol. 21, no. 1, pp. 33-38, 1991.

In an exemplary embodiment of the present invention, the 5 by 5 filter shown below may be used. The filter is given in K. R. Crounse, "Image halftoning with cellular neural networks", IEEE Trans. Circ. Syst-II, vol. 40, no. 4, pp. 267-283, 1993, normalized to have the sum of the coefficients equal to 1:

$$\begin{bmatrix} 0.00492 & 0.01391 & 0.02100 & 0.01391 & 0.00492 \\ 0.01391 & 0.05810 & 0.09772 & 0.05810 & 0.01391 \\ 0.02100 & 0.09772 & 0.01618 & 0.09772 & 0.02100 \\ 0.01391 & 0.05810 & 0.09772 & 0305810 & 0.01391 \\ 0.00492 & 0.01391 & 0.02100 & 0.01391 & 0.00492 \end{bmatrix}$$

In this exemplary embodiment, the filter L may be chosen to be the same for each of the images $A_1'$, $A_2'$ and $A_3'$. In some applications, for example, when the original images and the watermark images are intended to be viewed at different distances, the filter L can be different for each image.

In accordance with an exemplary embodiment of the present invention, to extract the watermark from the two halftone images $A_1$ and $A_2$, the binary operator) may be applied to each pair of pixels $(A_1(i,j), A_2(i,j))$ resulting in the extracted watermark image W. In other words, the (i,j)-th pixel of W is given by $W(i,j)=A_1(i,j)) A_2(i,j)$.

Because of the linearity, space-invariance, and a relatively small support of L, the computation of the variable "Error" in the iterative isotropic halftoning method may be sped up by updating the change in the variable "Error" due to changing a single pixel of "Outimage." In other words, changing a single pixel of "Outimage" only changes a small number (on the order of the size of the support of L) of entries of $L(Outimage_k-A_k')$. This technique has been used in dither mask construction when the output is binary (see e.g. C. W. Wu, G. Thompson and M. Stanich, "A unified framework for digital halftoning and dither mask construction: variations on a theme and implementation issues," Proc. IS&T's NIP19: Int. Conf. on Digital Printing Tech., pp. 793-796, 2003), but is equally useful in an exemplary embodiment of the present invention.

The output image "Outimage" may be initialized with an image having pixels having random values from a set of output vectors or from a uniform image of a single output vector. To reduce the number of iterations, "Outimage" may also be initialized by performing vector (or modified) error diffusion and using the output from the vector (or modified) error diffusion as the initial "Outimage."

Gamut Mapping

For the halftone image to resemble the original image, the error in the digital halftoning algorithm should be small or at least bounded for arbitrarily large images. In order for the error in the error diffusion halftoning method to be bounded, it was shown in the references by Adler et al. cited above that the pixels of the input image $(A_1' \times A_2' \times A_3')$ should be within a convex hull of the output vectors. This analysis is also applicable to general halftoning algorithms, and the low pass behavior of the human vision system can be viewed as an averaging behavior and the original image is approximated by a convex sum of output pixels. In order to satisfy this convex hull condition, an exemplary embodiment of this invention uses scaling or gamut mapping of the images.

In an exemplary embodiment of the present invention, the gamut mapping is as follows: Let S be the set of 3-tuples of pixels in $(A_1' \times A_2' \times A_3')$, i.e. $S=\{(A_1'(i,j), A_2'(i,j), A_3'(i,j))\}$. Furthermore, let $S_1, S_2,$ and $S_3$ be the sets of pixels of images $A_1', A_2',$ and $A_3'$ respectively, i.e. $S_1=\{A_1'(i,j)\}, S_2=\{A_2'(i,j)\},$ and $S_3=\{A_3'(i,j)\}$. For simplicity, consider only a gamut mapping M that maps a pixel p into a pixel M(p) of the following form:

$$\text{For } p=(p_1, p_2, p_3) \in S, \quad (1)$$

$$M(p)=(s_1 p_1+d_1, s_2 p_2+d_2, s_3 p_3+d_3)$$

where:
$s_i$ are real numbers denoting scaling factors; and
$d_i$ are offset vectors in the color space.

Let H be the (closed) convex hull of the output vectors. Then H can be expressed by a set of linear inequalities: $H=\{x: Ax \leq b\}$. A commonly used algorithm for finding the convex hull of a set of points is the Qhull algorithm described in C. B. Barber et al., "The quickhull algorithm for convex hulls," ACM Trans. Math. Software, vol. 22, no. 4, pp. 469-483, 1996. An optimization problem used to find the (optimal) gamut mapping may be formulated as follows:

$$\max_{s_i, d_i} \min\left(\frac{s_1}{\alpha_1}, \frac{s_2}{\alpha_2}, \frac{s_3}{\alpha_3}\right) \text{ under the constraint that } M(S) \in H \quad (2)$$

The set of parameters $\{s_i, d_i\}$ which solves the above optimization problem will be used as the gamut mapping M, i.e. every pixel of the input composite image $A_1' \times A_2' \times A_3'$ is scaled by M before they are halftoned by the exemplary halftoning algorithm in accordance with the present invention.

Other forms of the objective function may be used for other exemplary embodiments of the present invention. For example:

$$\max_{s_i, d_i} s_1 s_2 s_3 \text{ under the constraint that } M(S) \in H \quad (3)$$

The coefficients $\alpha_i$ in Equation (2) determine, relatively, the "penalty" of scaling each image. The smaller each $\alpha_i$ is, the more the corresponding image will be scaled. For instance, in a watermarking application, the two images $A_1$ and $A_2$ should retain most of the fidelity of the original images, while in contrast the watermark image, which in many applications is assumed to be a less complex image, may accept more distortion due to scaling. Thus, in this case, $\alpha_3$ may be smaller than $\alpha_1$ and $\alpha_2$.

It is clear that the constraints in Eq. (2) are linear, i.e. the inequality constraints $M(S) \in H$ is linear in the variables $s_i, d_i$. This is true since $M(S) \in H$ for each pixel $p=(p_1, p_2, p_3) \in S$ can be written as:

$$\sum_{i=1}^{3} \Lambda_i (s_i p_i + d_i) \leq b \quad (4)$$

Where:
$A=[\Lambda_1:\Lambda_2:\Lambda_3]$ is decomposed as a concatenation of the matrices $\Lambda_1, \Lambda_2$ and $\Lambda_3$ and A, b are the matrices describing the convex hull $H=\{x: Ax \leq b\}$.

If the number of pixels in the images is large, the constraints $M(S) \in H$ can be time consuming to compute. One way to speed up the computation is to not use all the pixels to compute the gamut, i.e. replace S with a subset $S'' \subseteq S$. This results in a larger feasible region as the set of parameters $(s_i, d_i)$ satisfying the constraint $M(S'') \in H$ (i.e. the set $\{(s_i, d_i): M(S'') \in H\}$) is larger than the set of parameters satisfying $M(S) \in H$. This means that the convex hull condition may not be strictly satisfied. However, if $S''$ is close to S, then the gamut mapping obtained using $S''$ is close to the gamut mapping obtained using S. In other words, the convex hull condition violation is mild. In experiments by the inventor, $S''$ being 5 percent of the pixels of S still gave good results.

Another way to speed up the computation is the following simplification which produces a smaller feasible region for the optimization problem in Eq. (2), and is easier to compute than $M(S) \in H$. However, since the feasible region is smaller, the gamut mapping is also less optimal.

Let $V_i$ be the set of extreme points of the convex hull of $S_i$. This means that the convex hull of $V_i$ is equal to the convex hull of $S_i$. Next replace the constraint $M(S) \in H$ with $M(S') \in H$, where $S'=\{(p_1, p_2, p_3): p_i \in V_i\}$. The convex hull of S' is then larger than the convex hull of S, i.e. the feasible region $\{(s_i,d_i):M(S')\epsilon H\}$ is smaller than $\{(s_i,d_i):M(S)\epsilon H\}$.

The gamut mapping may be computed using the pixel values of the specific images $A_1'$, $A_2'$ and $A_3'$. This gamut mapping in general is not appropriate for another set of images. By replacing $S_1$, $S_2$, and $S_3$ with the extreme points (which by abuse of notation denoted herein as $V_1$, $V_2$, and $V_3$, respectively) of the possible gamut (i.e. the possible range of the pixel values) of the images $A_1'$, $A_2'$ and $A_3'$, respectively, a gamut mapping obtained using the resulting $M(S')\epsilon H$ can be used for any possible image $A_1'$, $A_2'$ and $A_3'$.

For instance, suppose that the pixel in the image $A_2'$ can take on values between 0 and 1. Then by replacing $S_2$ with the set $\{0, 1\}$ (which is the set of extreme points of the interval [0,1]) and solving the optimization problem using the constraints $M(S')\epsilon H$ where $S'=\{(A_1'(i,j), p, A_3'(i,j)): p\epsilon\{0,1\}\}$, the resulting gamut mapping can be used with images $A_1'$ and $A_3'$ and any image $A_2'$ whose pixels lie in the interval [0, 1]. If all three $S_i$'s are replaced with the set $\{0, 1\}$, and the OR operation is used for extracting the watermark, i.e. the output vectors are (0, 0, 0), (0, 1, 1), (1, 0, 1), and (1, 1, 1), then the following gamut mapping: $s_1=s_2=s_3=0.25$, $d_1=d_2=0.5$, and $d_3=0.75$ is obtained, which can be used for all grayscale images $A_1'$, $A_2'$ and $A_3'$. Thus, by restricting the feasible region this way, sub-optimal gamut mappings that cause more distortion to the original images are obtained, but they are applicable to a larger set of images.

In accordance with an exemplary embodiment of the invention, the error calculation in the digital halftoning algorithm can also be weighted according to the desired fidelity. For instance, if a low fidelity watermark is adequate, the error calculation can be skewed to put more emphasis in reducing the error in the two main images. This is reflected in the parameters $v_i$ in the exemplary pseudo code shown above. In this case $v_3$ would be smaller than $v_1$ and $v_2$.

In an exemplary embodiment of the present invention, the condition that the input pixels lie in the convex hull of the output vectors may be violated mildly without much loss in the quality of the halftone images. This allows the gamut mapping to distort the image less.

EXAMPLES

Figure 1B:
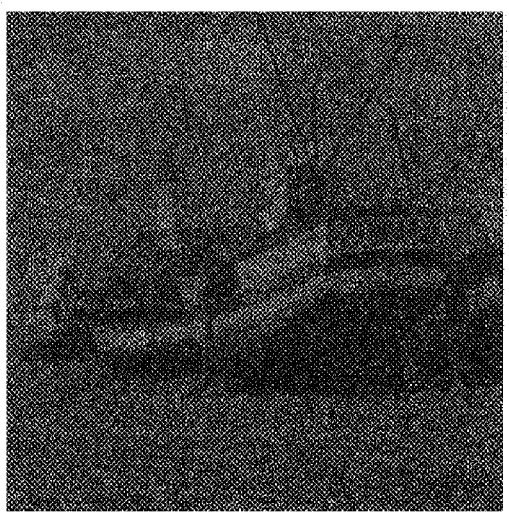
Figure 1C:

FIGS. 1A, 1B, and 1C illustrate the results of an exemplary embedding process in accordance with the present invention of embedding an image entitled "Lena" shown in FIG. 1C into two other images (i.e. those shown in FIGS. 1A and 1B). The first image shown in FIG. 1A is entitled "Baboon" and the second image shown in FIG. 1B is entitled "Boat." The gamut mapping was obtained using $\alpha_1=1$, $\alpha_2=1$, and $\alpha_3=0.5$. FIG. 1C is the extracted watermark image obtained by performing the OR operation on the pixels of the images of FIGS. 1A and 1B.

Figure 2A:
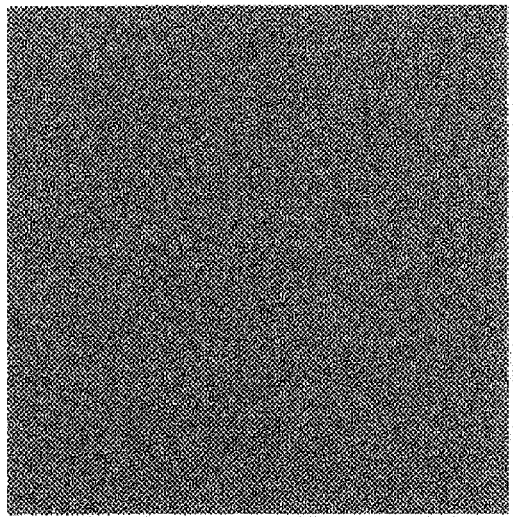
FIGS. 2A-2C illustrate the results of another exemplary embedding method of another image into two other images in accordance with the present invention.
Figure 2B:
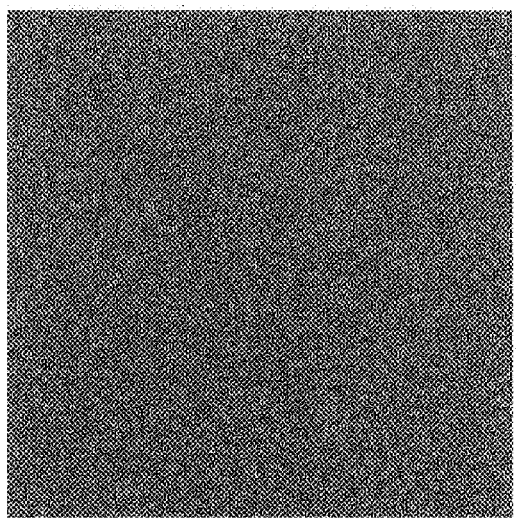
Figure 2C:

FIGS. 2A, 2B, and 2C illustrate the results of an embedding process in an exemplary embodiment in accordance with the present invention as shown in FIGS. 1A, 1B, and 1C, except that the "Lena" image shown in FIG. 2C is embedded into two images that are uniform gray images (FIGS. 2A and 2B). The gamut mapping here was computed using $\alpha_1=\alpha_2=\alpha_3=1$.

Figure 3A:
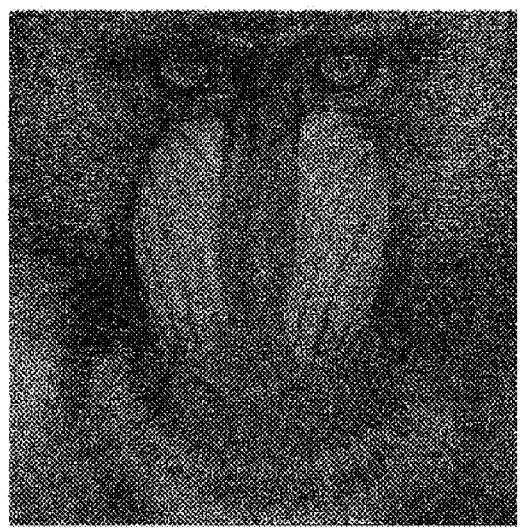
FIGS. 3A-3C illustrate the results of yet another exemplary embedding method of another image into two other images in accordance with the present invention.
Figure 3B:
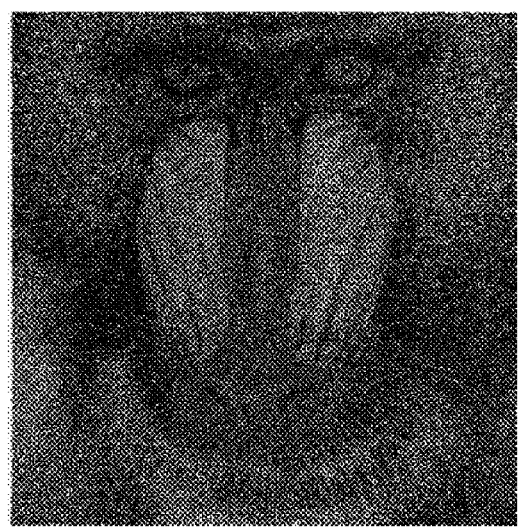
Figure 3C:

FIGS. 3A, 3B, and 3C illustrate the results of yet another exemplary embedding of the "Lena" image of FIG. 3C into the "Baboon" image of FIG. 3A and the "Baboon" image of FIG. 3B where the binary operation is the Exclusive-OR operation in accordance with the present invention. Note that the two "Baboon" images (FIGS. 3A and 3B) appear to be the same, but the halftone dots are arranged differently so that when an Exclusive-OR is applied, the watermark image ("Lena") of FIG. 3C emerges. The gamut mapping here was computed using $\alpha_1=\alpha_2=\alpha_3=1$.

Note that the extracted watermark images in these examples are of high fidelity. This is in contrast with the conventional methods, where a residual of the two halftone images is evident in the extracted watermark image.

Figure 4A:
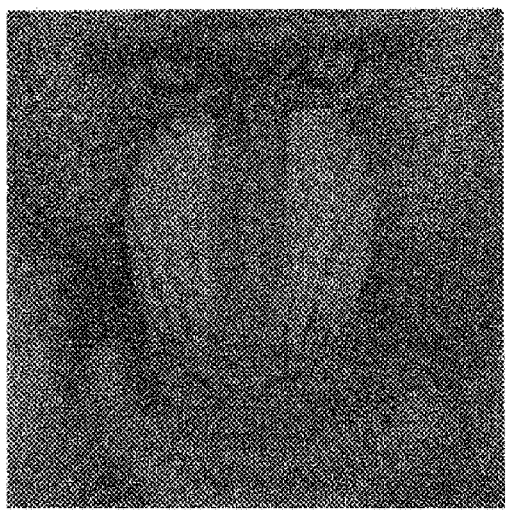
FIGS. 4A-4C illustrate the results of a further exemplary embedding method of another image into two other images in accordance with the present invention.
Figure 4B:
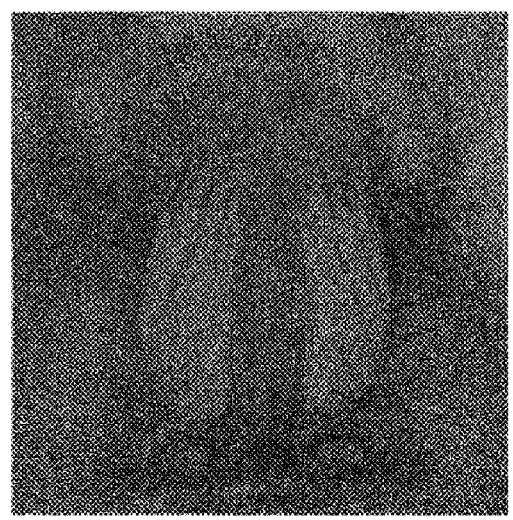
Figure 4C:

In yet another exemplary embodiment of the present invention, as shown in FIGS. 4A-4C, two images may be generated from reoriented versions of the same image. For example, the same image may be rotated 180 degrees to create a second image. These two images then form the images $A_1'$, and $A_2'$. The watermark image $A_3'$ is then embedded into these images to create the halftone images $A_1$, $A_2$ where $A_2$ is $A_1$ rotated 180 degrees. The idea is that the watermark can be extracted from a single image $A_1$ and its reoriented version $A_2$. In other words the image $A_1$ contains all the information needed to extract the watermark. Note that for this exemplary embodiment, there is an a causal relationship between the pixels of $A_1$ and $A_2$ and, thus, error diffusion may not be appropriate in this setting.

For this exemplary embodiment, the pseudo code described above may be modified as follows: For an R-pixels by C-pixels image, when computing "Error(o)", in addition to replacing Outimage$_k$(i,j) with $o_k$, Outimage$_1$(R−i+1,C−j+1) may be replaced with $o_2$, Outimage$_2$(R−i+1,C−j+1) may be replaced with $o_1$, and Outimage$_3$(R−i+1,−j+1) may be replaced with $o_2 \circ o_1$. Note that the (R−i+1,C−j+1)-th pixel is the (i,j)-th pixel rotated 180 degrees. Then when $o_{min}=(o_1',o_2',o_3')$ is found, set Outimage(i,j)=$o_{min}$, and set Outimage(R−i+1,C−j+1)=$(o_2',o_1',o_2' \circ o_1')$. Assuming that the binary operation $\circ$ is symmetric, then the watermark image $A_3$'0 must be such that it is invariant under 180 degree rotation. The gamut mapping may be chosen using $\alpha_1=\alpha_2$ with the additional constraints that $d_1=d_2$, $s_1=s_2$. Again, an example of this is shown in FIGS. 4A-4C where FIG. 4A is the halftone image "Lena" and FIG. 4A is the watermark that is revealed when the OR operation is applied to FIG. 4A and a copy of itself that is rotated 180 degrees (FIG. 4B). The gamut mapping is obtained using $\alpha_1=\alpha_2 1$, $\alpha_3=0.7$.

In general, an exemplary embodiment of the present invention may be used for more complicated applications of image watermarking, data hiding, and viewing images under different viewing conditions. For an image A that is represented as a matrix of pixels the (k, l)-th pixel of A may be denoted as A(k, l). Each pixel may be a vector in a color space T (which may vary from image to image), i.e. A(k, l)$\epsilon$T. Given n images $A_1, \ldots, A_n$, an exemplary watermark extraction transform $\Phi=(\phi_1, \ldots, \phi_m)$ constructs m images as follows: $\Phi(A_1, \ldots, A_n)=(B_1, \ldots, B_m)$ where $B_j=\phi_j(A_1, \ldots, A_n)$, i.e. $B_j$ are images created from the sets of images $A_1, \ldots, A_n$. The transform $\phi_j$ operates pixel wise on the images $A_1, \ldots, A_n$, i.e. $B_j(k, l)=\phi_j(A_1(k, l), \ldots, A_n(k, l))$.

Given a set of n+m images $A'_1, \ldots, A'_n$, and $B'_1, \ldots, B'_m$, an exemplary embodiment of the present invention may create n images $(A_1, \ldots, A_n)$ that resemble $A'_1, \ldots, A'_n$ such that the m images $B_1, \ldots, B_m$ that are extracted from $(A_1, \ldots, A_n)$ using transform $\Phi$ may resemble $B'_1, \ldots, B'_m$.

This exemplary embodiment uses a digital halftoning algorithm. Digital halftoning can be described in the following general form: given an image I a digital halftoning process creates a halftone image I' such that each pixel of I' is a member of a restricted set of output pixels O and, furthermore, I' resembles I under some metric d, i.e. d(I, I') is small.

This exemplary embodiment of the present invention specifies the set of output pixels in order to use a digital halftoning algorithm. The pixels of $A_i$ are chosen from the set $O_i$. Let $R \subseteq O_1 \times \ldots \times O_n = \{(p_1, \ldots, p_n): p_i \in O_i\}$ be the possible output vectors for the combined image $A_1 \times \ldots \times A_n$. The subset R can be a strictly smaller subset of $O_1 \times \ldots \times O_n$ in order to express additional relationships between pixels in different images. From R the set of extended output vectors $P = \{(p, \phi_1(p), \ldots, \phi_m(p)): p \in R\}$ is formed and $(A'_1 \times \ldots \times A'_n \times B'_1 \times \ldots \times B'_m)$ may be halftoned using P as the set of possible output vectors.

An exemplary pseudocode of the iterative isotropic halftoning algorithm for this general case is as follows:

```
for each iteration        /* Loop through iterations */
    for each i            /* Loop through each row */
        for each j        /* Loop through each column */
            for each output vector o = (o₁, . . ., o_{n+m}) ∈ P
            /*Loop through all possible output vectors */
                replace Outimage_k(i, j) with o_k for k = 1, . . . , n+m.
                set
```

$$\text{Error}(o) = \sum_{k=1}^{n} v_k^A \|L(\text{Outimage}_k - A'_k)\| + \sum_{k=1}^{m} v_k^B \|L(\text{Outimage}_{n+k} - B'_k)\|$$

```
            endfor
            find output vector o_min ∈ P that minimizes Error, i.e.
```

$$o_{min} = \arg \min_{o \in P} \text{Error}(o).$$

```
            set Outimage(i, j) = o_min.
        endfor (j)
    endfor (i)
    if Outimage has not changed between two iterations
    or maximum number of iterations reached, exit iterations loop.
endfor
```

Where:

$A_1', \ldots, A_n', B_1', \ldots, B_m'$ are the input images;

P is a set of output vectors;

Output: set $(A_1, \ldots, A_n, B_1, \ldots, B_m)$=Outimage which resembles $(A_1', \ldots, A_n', B_1', \ldots, B_m')$. The output halftone images are $A_1, \ldots, A_n$; and $v_k^A$ and $v_k^B$ determines how strongly the error in each image is minimized.

To satisfy the convex hull condition, the pixels of $(A'_1 \times \ldots \times A'_n \times B'_1 \times \ldots \times B'_m)$ are first scaled via the gamut mapping M. The gamut mapping M is calculated by solving the optimization problem $$\max_{s_i, d_i} \min_i \frac{s_i}{\alpha_i} \quad (5)$$

under the constraint that $(s_1 p_1 + d_1, \ldots s_{n+m} p_{n+m} + d_{n+m}) \in H$ for all pixels $p = (p_1, \ldots, p_{n+m})$ of $(A'_1 \times \ldots \times A'_n \times B'_1 \times \ldots \times B'_m)$ where H is the convex hull of the output vectors in P. The gamut mapping is then given by:

$$M: (p_1, \ldots, p_{n+m}) \to (s_1 p_1 + d_1, \ldots, s_{n+m} p_{n+m} + d_{n+m})$$

In another exemplary embodiment, the objective function in Equation (5) may be replaced by:

$$\max_{s_i, d_i} \prod_i s_i \quad (6)$$

With the above in mind, an exemplary method of the invention may be generalized with reference to the flowchart shown in FIG. 6. The flowchart starts at step 600 and continues to step 602 where the control routine inputs images. For example, the control routine may input images $A_1', \ldots, A_n'$, and $B_1', \ldots, B_m'$ at step 602.

The control routine may then continue to step 604, where gamut mapping, as described above, is applied to the input images. The control routine may then continue to step 606 where the digital halftoning method described above is applied to the gamut mapped images. Then, at step 608, the control routine ends and may, optionally, return to the process that called the control routine of FIG. 6.

In another exemplary embodiment of the present invention different combinations of images produce different watermarks. For example, for the case (n=3, m=2), given three images $A_1$, $A_2$, and $A_3$, combining $A_1$ and $A_2$ may output one watermark $B_1$, and combining $A_1$ and $A_3$ may output another watermark $B_2$.

Figure 5D:
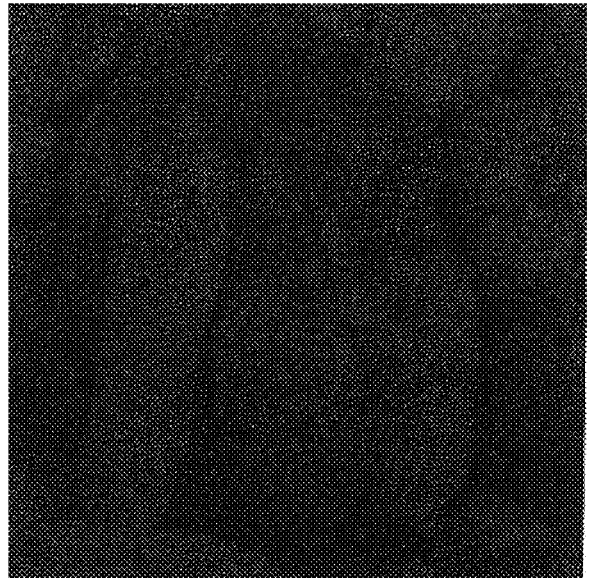
Figure 5E:
Figure 8:
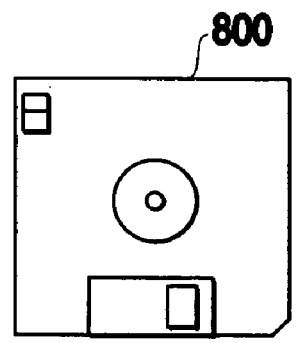
FIG. 8 illustrates an exemplary signal bearing medium 800 (e.g., storage medium) for storing steps of a program of a method according to the present invention.

An example of the results of using this exemplary embodiment is shown in FIGS. 5A-5C where the gamut mapping was computed using $\alpha_1 = \alpha_2 = \alpha_3 = 1$, and $\alpha_4 = \alpha_5 = \frac{1}{2}$. FIGS. 5A, 5B, and 5C show halftone images of a "Baboon," a "Boat," and a "Boat on a lake," respectively. The "Peppers" image shown in FIG. 5D is obtained by overlaying the images of FIG. 5A and FIG. 5B, and the "Lena" image shown in FIG. 5E is obtained by overlaying the images of FIG. 5A and FIG. 5C.

Multibit Images, Color Images and Other Extensions

Yet another exemplary embodiment of the present invention may also provide a multi-bit output. In this case, gray levels of two images are simply added (with clamping) to produce the gray level of an overlaid image. When each component of the output vector is from a q-bit quantizer (e.g. the binary case is when q=1), the number of output vectors is large when q is large. In this case, the innermost loop of the exemplary pseudo code described earlier that searches for the output vector that minimizes "Error" may take many computations. Since $o_{min}$ is the output vector that gives the minimal value of "Error" among all choices of the output vectors at location (i,j), the computation of $$o_{min} = \arg \min_{o \in P} \text{Error}(o)$$

is a discrete optimization problem. For large q this may be relaxed to a continuous optimization problem and solved using nonlinear programming and the result may then be quantized by a q-bit quantizer.

This exemplary embodiment may also be used for color images. In this case each pixel in a color image lies in a multi-dimensional color space such as CIELab, RGB, CMYK, or the like, and digital halftoning may be performed in the Cartesian product of these color spaces. Instead of processing in the Cartesian product of multi-dimensional color spaces, the images may also be decomposed into their color planes and each plane may be processed independently as a grayscale image and the results may then be combined afterwards. This alternative approach appears to work well in the RGB color space.

Similarly, since the human aural system exhibits a low pass behavior, similar to the human visual system, an exemplary embodiment of the present invention may be used to watermark audio data and/or signals.

FIG. 7 illustrates a typical hardware configuration of an information handling/computer system for use with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 740.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive"or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Figure 9:
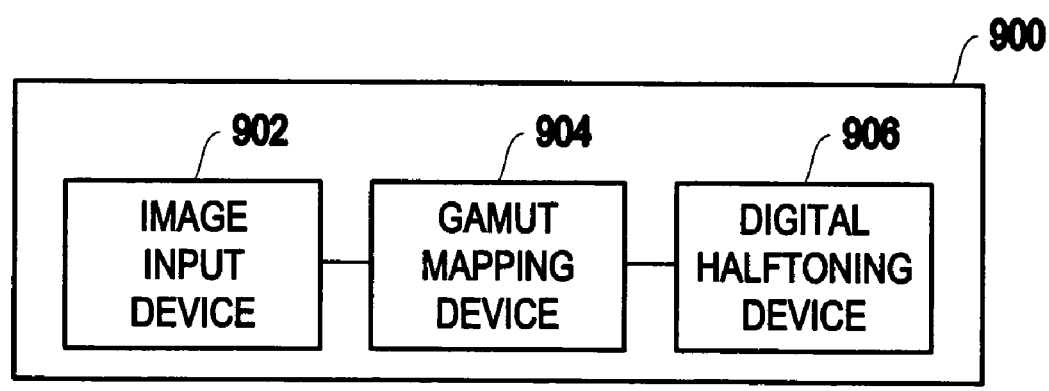
FIG. 9 illustrates another exemplary image embedding system 900 for incorporating the present invention.

FIG. 9 illustrates yet another exemplary embodiment of a system 900 for embedding an image into two other images in accordance with the present invention. The system 900 includes an image input device 902, a gamut mapping device 904 and a digital halftoning device 906. The image input device 902 inputs the image to be embedded as well as the two other images in which the one image will be embedded. The gamut mapping device 904 receives the images input by the image input device 902 and performs the gamut mapping process described above on the images. The digital halftoning device 906 performs a digital halftoning process on a Cartesian product of color spaces to embed the image into the two images.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of embedding an image into two images, comprising:

performing a digital halftoning process on a Cartesian product of color spaces to embed the image into the two images, wherein the digital halftoning process comprises an iterative isotropic halftoning process, wherein the iterative isotropic halftoning process comprises:

--- for each iteration
    for each i
        for each j
            for each output vector $o = (o_1, o_2, o_3) \in P$
            replace Outimage$_k$(i, j) with $o_k$ for $k = 1, 2, 3$, $$\text{set Error}(o) = \sum_{k=1}^{3} v_k \|L(\text{Outimage}_k - A'_k)\|$$

endfor $$\text{find output vector } o_{min} = \arg \min_{o \in P} \text{Error}(o)$$

set Outimage(i, j) = $o_{min}$.
    endfor (j)
endfor (i)

--- wherein if Outimage has not changed between two iterations or maximum number of iterations reached, then exit the iterations loop, where:

$A_1'$, $A_2'$ and $A_3'$ are input images;

P comprises a set of output vectors;

Output comprises $A_1'$ and $A_2'$ where $(A_1, A_2, A_3)$=Outimage which resembles $(A_1', A_2', A_3')$;

$v_i$ determines how strongly the error in each image is minimized; and

L comprises a linear space-invariant model of a human vision system.

2. The method of claim 1, wherein said Outimage is initialized using a random set of pixels.

3. The method of claim 1, wherein said Outimage is initialized using a uniform image of a single output vector.

4. The method of claim 1, wherein said Outimage is initialized by performing vector error diffusion.

5. The method of claim 1, wherein said Outimage is initialized by performing modified error diffusion.

6. The method of claim 1, wherein pixels of the input image are within a convex hull of the output vectors.

7. The method of claim 1, further comprising gamut mapping the images.

8. The method of claim 7, wherein the gamut mapping comprises:

for $p=(p_1, P_2, p_3) \in S$, $M(p)=(s_1 p_1 + d_1, s_2 p_2 + d_2, s_3 p_3 + d_3)$ where:

$s_i$ comprise real numbers denoting scaling factors;
$p_i$ comprise pixels;
S is a set of 3-tuples of pixels;
M is a gamut mapping of a pixel P; and
$d_i$ comprise offset vectors in the color space.

9. The method of claim 8, further comprising using the Qhull algorithm.

10. The method of claim 7, further comprising optimizing the gamut mapping.

11. The method of claim 10, wherein optimizing the gamut mapping comprises:

$$\max_{s_i,d_i} \min\left(\frac{s_1}{\alpha_1}, \frac{s_2}{\alpha_2}, \frac{s_3}{\alpha_3}\right)$$

such that $M(S)\epsilon H$ wherein $s_i$ comprise real numbers denoting scaling factors;
wherein $\alpha_1$ is a "penalty" coefficient of scaling;
wherein M(S) is a mapping of set S of pixels; and
wherein H is the convex hull of the output vectors.

12. The method of claim 10, wherein the optimizing of the gamut mapping comprises: solving $$\max_{s_i,d_i} s_1 s_2 s_3$$

such that $M(S)\epsilon H$,
wherein H comprises the convex hull of the output vectors.

* * * * *